Figure 1:
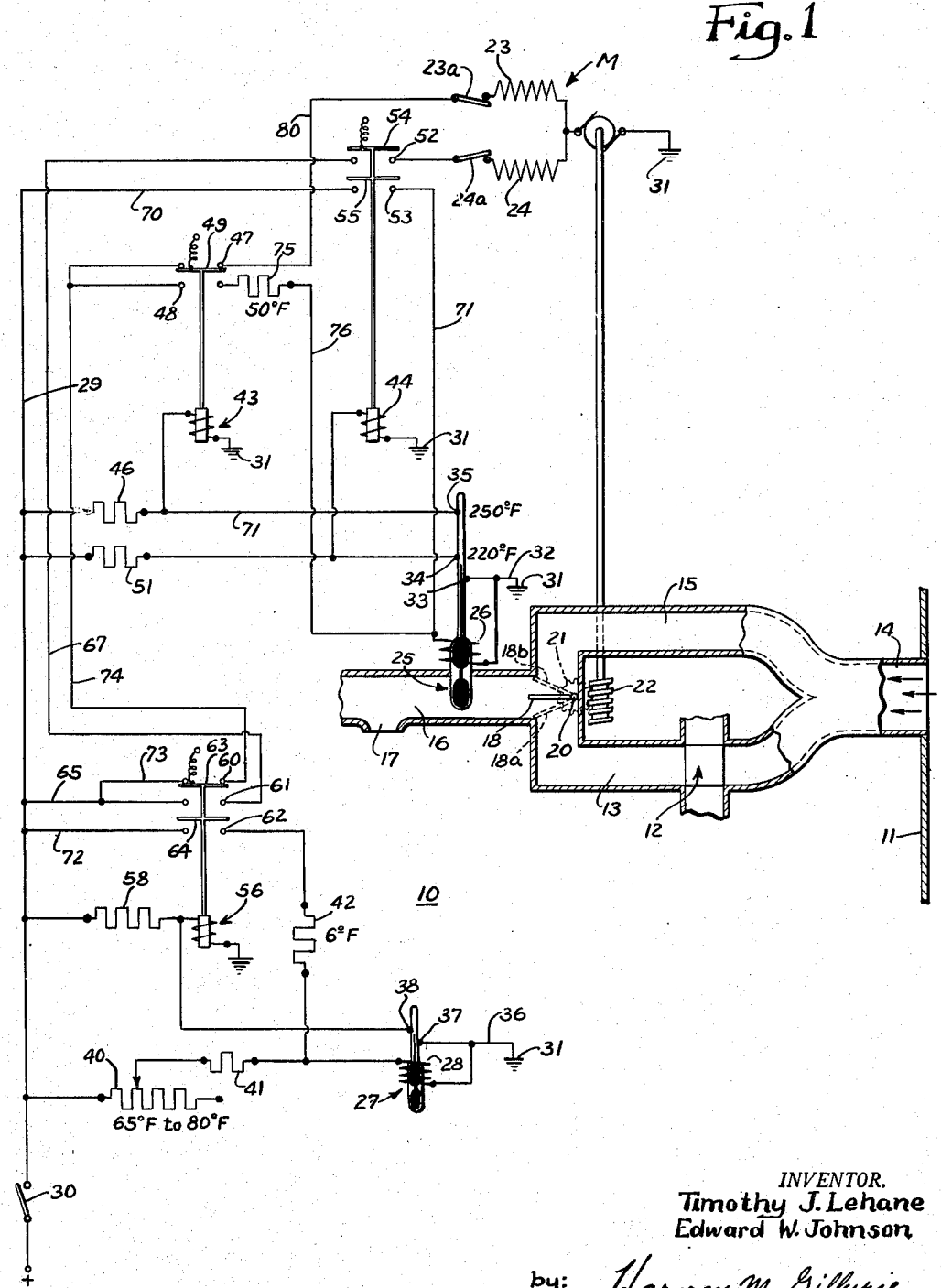

Oct. 20, 1953

T. J. LEHANE ET AL 2,656,111

TEMPERATURE CONTROL SYSTEM

Filed Feb. 18, 1952

2 Sheets-Sheet 2

INVENTOR.
Timothy J. Lehane
Edward W. Johnson by: Harry M. Gillespie
Atty.

Patented Oct. 20, 1953

2,656,111

UNITED STATES PATENT OFFICE 2,656,111

TEMPERATURE CONTROL SYSTEM

Timothy J. Lehane, North Riverside, and Edward W. Johnson, Chicago, Ill., assignors to Vapor Heating Corporation, Chicago, Ill., a corporation of Delaware Application February 18, 1952, Serial No. 272,228

10 Claims. (Cl. 236—9)

The present invention relates to temperature control systems and more particularly to an improved control system for regulating the movements of a directional valve member or damper by means of which streams of heated and unheated air may be blended in predetermined proportions prior to introduction of the blended air into an enclosed space to maintain the space at a substantially constant desired temperature.

It is among the principal objects of the invention to provide, in a heating system of the above character, improved means for automatically adjusting the position of the directional valve member in response to the temperature of the heated air stream and for modifying the adjustment of the valve member in response to temperature variations within the enclosed space in such a manner that abnormal increase in the temperature heated air stream will not be appreciably reflected in the temperature of the blended air delivered into the space.

In carrying out the above mentioned object, the invention, in either of two illustrated forms thereof, contemplates the provision of a thermostat which is responsive to the temperature of the blended air stream and a second thermostat which is responsive to changes of temperature in the enclosure. A reversible motor is provided for imparting increments of motion to the directional valve member in opposite directions to restrict the flow of heated air and enhance the flow of unheated air for blending purposes and vice versa.

Each thermostat controls an associated relay and is provided with an electrical heater for applying auxiliary heat to the thermostat. The heater is connected through the relay so that the electrical heat is recurrently applied to and removed from the thermostat so as to produce cycling of the thermostat. Actuation of one of the relays serves to partially close an electrical circuit through the motor for moving the directional valve member in a direction to enhance the flow of heated air entering the blended air delivered into the enclosure, while actuation of the other relay serves to completely close the partially closed circuit existing by virtue of the first relay mechanism. The cycling operations of the two thermostats are independent of each other and each is dependent upon its own ambient temperature. The cycling rate of each thermostat varies as the ambient temperature rises to a predetermined degree and the relays, operating under the control of their respective thermostats, intermittently become jointly effective to pass impulses to the motor to operate the latter in a direction to move the valve member and enhance the heating effect.

A third relay operable under the control of one of the thermostats becomes effective when the ambient temperature at one of the thermostats attains a relatively high degree to partially close a circuit through the motor for moving the control valve member in a direction to restrict the flow of heated air and the cycling operations of the other thermostat then becomes effective through actuation of the relay controlled thereby to completely close the circuit through the motor.

In one form of the invention the third relay is operable under the control of the thermostat which is controlled by the temperature of the blended air, while in another form, the third relay is operable under the control of the thermostat which is controlled by the temperature of the enclosure. In the first instance the system is conductive toward an initial retarded movement of the control valve toward an extreme position while in the second instance a more rapid initial movement of the control valve in a direction to increase the proportion of heated air relative to unheated air in the blended stream is attained.

The provision of a control system of the character briefly outlined above being the principal object of the invention, other objects and advantages not at this time enumerated will become apparent as the nature of the invention is better understood.

In the accompanying drawings forming a part of this specification, two embodiments of the invention have been illustrated.

Figure 2:
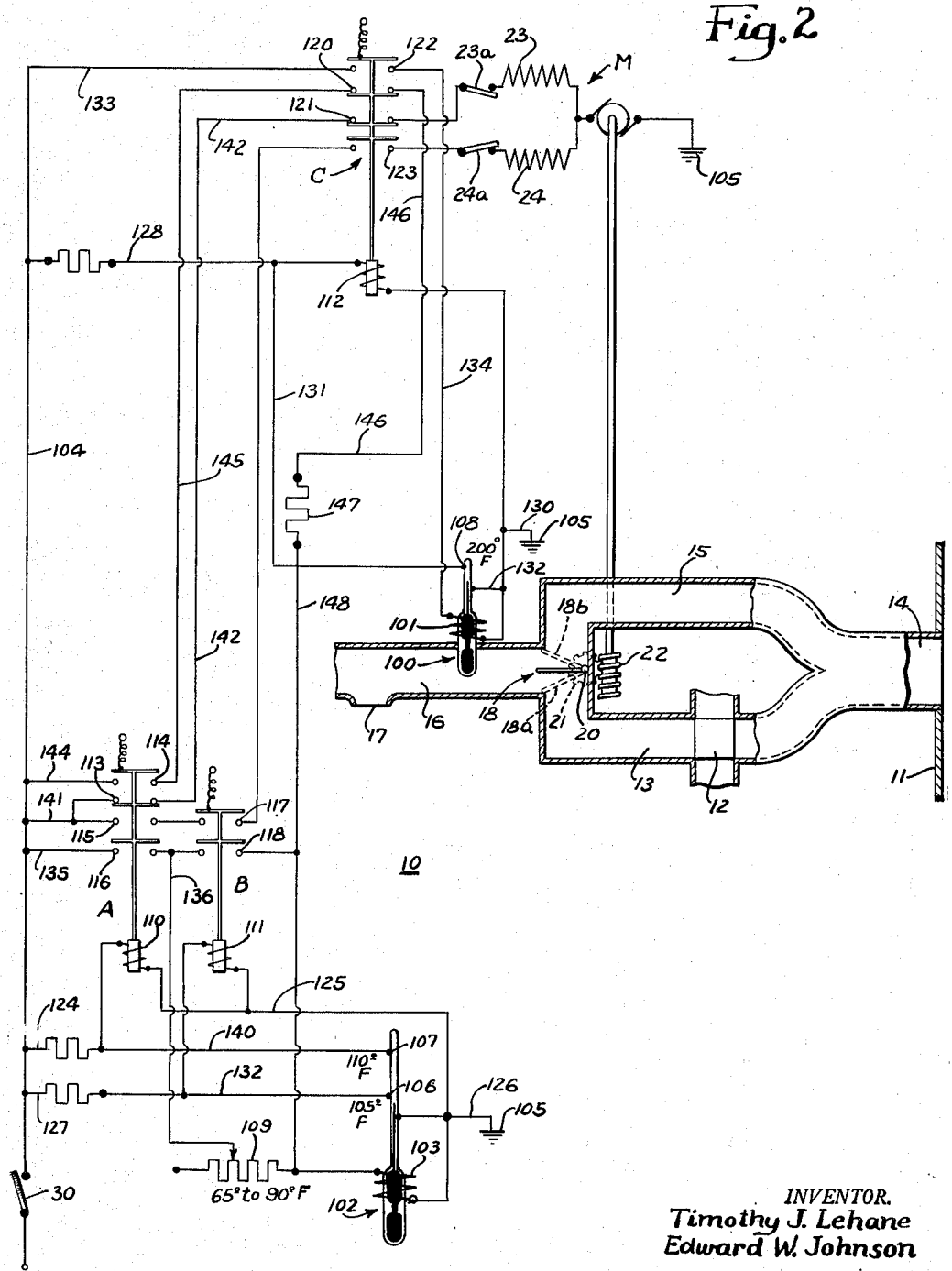

In these drawings:

Fig. 1 is a schematic diagram of one form of heating and temperature control system constructed in accordance with the principles of the present invention; and Fig. 2 is a schematic diagram similar to Fig. 1 showing a modified form of temperature control system.

The invention has, purely for illustrative purposes, been illustrated in connection with aircraft heating systems wherein an enclosure such as an aircraft cabin is to be heated, utilizing the exhaust gases of the aircraft engine for heating purposes. The invention is however capable of other uses and the same may, with or without modification, be employed for heating other enclosures, utilizing heat derived from any available source.

In the form of the invention shown in Fig. 1, an area 10 which is to be heated and the temperature thereof regulated by one form of control system of the present invention may be regarded as being the cabin enclosure of an aircraft a fragment of which is shown at 11. The supply of heat for the cabin 10 may be derived from the hot exhaust gases from the aircraft combustion power unit and accordingly a heat exchange device 12 of any suitable design is positioned in a branch conduit 13 leading from an air intake conduit 14 by means of which unheated air is taken from the outside of the aircraft by the oncoming draft of air produced by movement of the craft through the atmosphere. A second branch conduit 15 serves to by-pass unheated air around the heater 12 so that the heated and unheated streams become combined in a distributor duct 16 communicating with the branch conduits 13 and 15. The duct 16 may be provided with any suitable number of outlet ports 17 which discharge into the cabin compartment.

A directional valve 18 is mounted on a shaft 20 for swinging movements in opposite directions about the axis of the shaft between one limiting position wherein the branch conduit 13 is closed and another limiting position wherein the branch conduit 15 is substantially closed. The shaft 20 carries a worm wheel 21 which meshes with a worm 22 adapted to be selectively driven in opposite directions by means of a reversible electric motor M having field windings 23 and 24 capable of being selectively energized to cause corresponding movements of the valve element 18 in opposite directions. Limit switches 23$^a$, 24$^a$ adapted to be opened and closed by the movement of the motor are connected in the motor energizing circuits. When the valve 18 is at any location intermediate the extreme positions indicated at 18$^a$, 18$^b$, both limit switches assume their closed positions. However, when the valve 18 reaches the position indicated at 18$^a$, the final movement of motor M opens the limit switch 23$^a$. While the said limit switch 23$^a$ remains open, the motor M can be energized only through the said field winding 24 so as to move the valve 18 from said position 18$^a$ in a clockwise direction to admit increasing increments of heated air into the distributor duct 20, while at the same time admitting decreasing increments of unheated air to the duct 20. When the field winding 23 of the motor M is energized the valve member 18 will be rotated in a counterclockwise direction so that decreasing increments of unheated air will be admitted to the distributor duct 20.

A thermostat 25 which may be of the mercury column type is positioned to respond to the temperature within the delivery duct 16. The thermostat 25 is provided with an electric heating coil 26, the purpose of which is to apply auxiliary heat to the thermostat when the coil is energized to thus cause accelerated expansion of the mercury column under certain conditions to produce cycling operations of the thermostat. A second thermostat 27 is located within the compartment 10 and is responsive to temperature variations therein. The thermostat 27 is likewise provided with an electric heating coil 28.

Current is supplied to the electric control instrumentalities of the heating system from a main supply conductor 29, representing the positive side of the line, under the control of a main switch 30 adapted to be closed when the system is set into operation. Current may flow from the supply line 29 through the various electrical devices of the system to the negative side of the line at locations variously designated as ground 31.

The mercury column of the thermostat 25 is grounded through a lead 32 and contact terminal 33. The thermostat is provided with two additional contact terminals 34 and 35 which are so located relative to the column as to be engageable by the latter under conditions commensurate with certain ambient temperatures which, as labelled on the drawing, for the lower contact 34 may be 220° F. and for the upper contact 35 may be 250° F. When the temperature within the duct 16 is below 220° F., the mercury column will fall below the contact terminal 34; when the temperature in the duct 16 is between 220° F. and 250° F. the column will be in electrical contact with the contact terminal 34 but not the terminal 35; and when the temperature within the duct rises above 250° F. the column will be in electrical contact with both terminals 34 and 35, except when biasing heat is applied to the thermostat by means of the heating coil 26.

The mercury column of the thermostat 28 is grounded through a lead 36 and contact terminal 37 and the thermostat is provided with an additional contact terminal 38 which is positioned relative to the column so as to be engaged by the latter when a predetermined normal ambient temperature is attained within the compartment 10. The predetermined temperature at which the mercury column of the thermostat 27 engages the contact terminal 38 may be varied between normal limits of from 65° F. to 80° F. by means of an adjustable heating circuit extending from the supply line 29 through a variable resistor 40, current limiting resistor 41, heating coil 28 to ground. The thermostat 27 is subject to biasing heat supplied by the coil 28 through a second electrical circuit including a biasing coil 42 adapted to be energized under conditions that will be set forth subsequently.

A first relay magnet 43 and a second relay magnet 44 are each operable under the control of the thermostat 25. The relay magnet 43 is disposed in a normally energized circuit extending from the supply line 29, through resistor 46 and magnet 43 to ground. The magnet 43 has a pair of normally closed contacts 47 and a pair of normally open contacts 48 together with a spring-loaded contact bar 49 adapted to bridge the normally open contacts 48 when the magnet 43 is energized. The previously described circuit for the magnet 43 is adapted to remain in effect until such time as the column of the thermostat 25 engages the terminal 35, at which time a shunt circuit will exist from the supply line 29 through resistor 46 and terminals 33 and 35 to ground, thus de-energizing the magnet 43 to close the contacts 47 and open the contacts 48.

The relay magnet 44 exists in a normally closed circuit extending from the supply line 29 through resistor 51 to ground. The relay magnet 44 has associated therewith two pairs of normally open contacts 52 and 53, together with respective contact bars 54 and 55 movable from open positions when the magnet 44 is de-energized to closed positions when the magnet is energized. The circuit for the magnet 44 is adapted to remain in effect until the column of the thermostat 25 engages the contact terminal 34, whereupon a shunt circuit will exist from the supply line 29 through the resistor 51, contact terminals 34 and 33 to ground to thus de-energize the magnet and allow contacts 52 and 53 to become open.

A third relay magnet 56 is operable under the control of the thermostat 27 and is disposed in a normally energized circuit extending from the line 29 through resistor 58 and magnet 56. This circuit remains in effect until the column of the thermostat 27 engages the terminal 38, at which time a shunt circuit will exist from the line 29 through resistor 58, contact terminals 38 and 37 to ground, thus de-energizing the magnet so as to cause the contacts 60 to become bridged and the contacts 61 and 62 to become opened.

The several relays are shown in their deenergized position, since the main switch 30 is open. If it is assumed that the valve 18 is in an intermediate position so that both limit switches 23ᵃ and 24ᵃ are closed, and that the heating system is to be put into effect when the temperature within the duct 16 is below the predetermined temperature of 220° F., as herein shown, and that the temperature, as herein shown, for the compartment 10 is below the temperature setting of the thermostat 27 as determined by the position of the variable resistor 40, closure of the master switch 30 will serve to energize both magnets 43 and 44 associated with the duct thermostat 25 as well as the magnet 56 associated with the compartment thermostat 27 through their previously described circuits.

Energization of the magnet 44 will serve to close both pairs of contacts 52 and 53 associated therewith. Closure of the contacts 52 will establish a circuit extending from the line 29 through leads 65, contacts 61 (now closed), lead 67, contacts 52 (also closed), and field winding 24 to ground. Energization of the field winding 24 will cause the motor to rotate in such a direction as to move the valve 18 in a clockwise direction to restrict the branch conduit 15 and retard the flow of unheated air therethrough while enhancing the flow of heated air through the branch conduit 13. Since starting operations are in effect it may be assumed that the heater 12 will not have arrived at its full heating capacity so that no unduly large quantity of heat will be delivered to the enclosure 10 to such an extent as to cause discomfort due to large and sudden heat output. However, as the output of the heater 12 increases and the proportion of heated air entering the duct 16 increases, the column of the thermostat 25 will gradually rise until it makes electrical contact with the conductor terminal 33. The gradual rise of the mercury column of the thermostat 25 is augmented by auxiliary heat supplied to the thermostat coil 26 through a circuit extending from the line 29 through leads 70, closed contacts 53, lead 71, coil 26 and lead 32 to ground. As soon as the column engages the terminal 34, the previously described circuit through the current limiting resistor 51 will become effective to shunt the coil 50 and de-energize the magnet 44 to open the circuit through the contacts 53 and coil 26. Such de-energization of the magnet 44 will again open the contacts 53 and de-energize the heating coil 26.

It will be seen that when the combined temperatures of the duct 16 and the auxiliary heating coil 26 are sufficient to shunt the relay magnet 44, a cycling action of the thermostat will take place.

Because of the fact that the temperature of the enclosure 10 is still below the setting of the thermostat 27 the contacts 61 of the magnet 56 will remain closed. These contacts are arranged in a series circuit with the contacts 52 of the magnet 44 and thus cycling of the thermostat 25 will cause intermittent energization of the field coil 24 and each energization thereof will serve to apply an increment of clockwise rotation to the valve 18, thus widening the effective flow area through the branch conduit 13 and narrowing the flow area through the branch conduit 15.

Such cycling of the thermostat 25 will continue as long as the column remains in the vicinity of the contact terminal 35 and meanwhile more and more heating is discharged from the distributor duct 16 into the enclosure 10 thus causing the column of the thermostat 27 to rise. As the temperature of the compartment approaches the setting of the thermostat, the column augmented by auxiliary heat will engage the terminal 38, thus energizing the shunting circuit for the coil 56 and causing the latter to become de-energized to close the contacts 60 and open the contacts 61 and 62. The auxiliary heat supplied by the coil 28 exists not only by virtue of the circuit leading through the variable resistor 40 but also by virtue of a circuit extending from the supply line 29 through lead 72, contact 62, resistor 42, coil 28 and lead 26 to ground. The resistor 42 permits six degrees of heat to be applied to the column and when the magnet 56 becomes de-energized and the contacts 62 open, the circuit through the resistor 42 is discontinued so that the thermostat 27 is subjected to a cycling action. The cycling actions of the two thermostats 25 and 27 are independent of each other and each takes place under the control of ambient temperature conditions. Upon de-energization of the relay magnet 56, the contacts 61 become opened thus opening the motor circuit through the winding 24 while the contacts 60 become closed. Opening of the contacts 61 renders the intermittent closure of the contacts 52 ineffective to energize the field winding 24 so that the valve will remain motionless as long as the contacts 61 remain open.

Intermittent closure of the contacts 60 due to cycling of the thermostat 27 establishes a circuit extending from the line 29 through leads 65, 73, contacts 60, lead 74, contacts 48 of the magnet 43 (now closed), resistor 75, lead 76, auxiliary heating coil 26 and lead 32 to ground. The resistor 75 serves to apply auxiliary heat to the thermostat 25 in the amount of approximately 50° thus rapidly accelerating the rise of the column of this thermostat toward the terminal 35 which represents the 250° F. level of the column.

If the degree of heat supplied by the heater 12 is sufficient to allow the mercury column to engage the contact terminal 35, a shunting circuit will exist extending from the line 29, through the resistor 46, lead 77, terminals 35 and 34, and lead 78 to ground. This circuit will cause de-energization of the magnet 43, thus closing contacts 47 and opening contacts 48. Closure of contacts 47 will establish a circuit through the field winding 23 but only at such times as the cycling of the thermostat 27 permits the contacts 60 of the magnet 44 to become closed. This circuit exists from the line 29, through leads 65, 73, closed contacts 60, lead 74, contacts 47, lead 80 and field coil 23 to ground. Thus the motor M is actuated to cause counterclockwise rotation of the valve 18 to decrease the flow of heated air through the by-pass conduit 13 and increase the flow of unheated air through the by-pass conduit 15.

From the above description it will be seen that when the temperature of the duct 16 is relatively cool, more auxiliary heat will be required to cause the column of the thermostat 25 to engage the terminal 34 inasmuch as the heating coil will dissipate its heat more rapidly than when the ambient temperature is high. Consequently the column will remain below the level of the terminal 34 for a longer period of time during cycling operations than when the ambient temperature is high. This condition results in adjusting the valve 18 in a direction to increase the delivery of heat to the duct 16. However, as the temperature of the duct 16 increases, the increments of time during which the column will make contact with the terminal 34 will increase so that the increments of motion applied to the valve 18 will drop off to nothingness. The same is true regarding the cycling of the thermostat 27. The same is true of the thermostat 27 and when the temperature of the enclosure 10 is low, the periods of time during which the mercury column remains out of contact with the terminal 38 will be relatively long. As the temperature rises, these periods will become shorter. It is necessary during independent cycling of the two thermostats for the relay magnets 56 and 44 to be energized simultaneously to energize the field winding 24. Similarly, it is necessary for the magnets 56 and 43 to be de-energized simultaneously to energize the field coil 23.

When the column of the thermostat 27 engages the terminal 38 due to a rise of temperature in the compartment, the magnet 56 will become de-energized and the previously described circuit through the coil 75 will place a 50° heat bias on the thermostat 25, thus raising the column to its 220° F. level wherein it engages the terminal 35 to de-energize the magnet 44 and prevent further application of impulses to the field winding 24. Any increase or decrease of temperature in the duct 16 will be reflected by a raising or lowering of the column of the thermostat 25. If the rise is sufficient to cause the same to engage the terminal 34, the magnet 44 will be de-energized. A further rise in temperature wherein the column engages the terminal 35 will cause the magnet 43 to be de-energized. When the increase or decrease is subsequently reflected in the column of the thermostat 27, the proper motor circuits will be established to move the control valve 18 in the proper direction to reflect such increase or decrease in temperature.

From the above description it will be seen that during the initial starting up of the system, cycling of the thermostat 25 will commence before the heat developed in the duct 16 is sufficiently high as to cause discomfort to the occupants of the compartment 10. This cycling action, which is slow at the outset, invariably takes place before the heater 12 attains its maximum output. Since the cycling of the thermostat causes intermittent opening of the contacts 52 in the circuit for the field winding 24, the valve 18 is prevented from moving to its extreme position of maximum heat delivery so that a rapid increase in the output of the heater will not be reflected in the temperature of the compartment with undue suddenness.

It will also be observed that the circuit through the field winding 23 may not be established unless the condition of the thermostat 27 is such that the magnet 56 is de-energized. Such a condition can take place only when the thermostat is undergoing cycling and when the height of the column causes engagement of the terminal 38. Thus the valve 18 may be moved toward its position of low heat admission only when the temperature of the compartment 10 is relatively high.

In Fig. 2 a modified form of control system is disclosed. The enclosure 10, duct 16, vents 17, branch circuits 13 and 15, valve 18, valve moving mechanism 20, 21, 22 and motor M remain substantially the same as in the form of the invention shown in Fig. 1. In this system, a rapid movement of the valve 18 in a clockwise direction to restrict the flow of unheated air through the conduit 15 and to enhance the flow of heated air through the conduit 13 is desired when the temperature within the duct 16 is low.

The duct thermostat 100 is provided with an auxiliary heating coil 101 while the compartment thermostat 102 is provided with a similar heating coil 103. The supply line and various sources of ground are shown at 104 and 105 respectively. The thermostat 102 is provided with spaced contacts 106 and 107 which are closed by the mercury column of the thermostat at 105° F. and 110° F. respectively. The thermostat 100 is provided with a contact 108 which is engaged by the grounded mercury column at 200° F. A variable resistor 109 is provided for adjusting the setting of the thermostat 102 between upper and lower limits of 65° F. and 90° F. respectively.

A first relay A having an actuating magnet 110 and a second relay B having an actuating magnet 111 are each operable under the control of the thermostat 102 while a single relay C having an actuating magnet 112 is operable under the control of the thermostat 100. The relay A is provided with a pair of normally closed contacts 113 and with three pairs of normally open contacts 114, 115 and 116. Upon energization of the relay A the contacts 113 are opened while the contacts 114, 115 and 116 are closed. The relay B is provided with two pairs of normally open contacts 117 and 118 both adapted to become closed when the magnet 111 is energized. The relay C is provided with two pairs of normally closed contacts 120 and 121 and with two pairs of normally open contacts 122 and 123. Energization of the magnet 112 of relay C serves to open the relay contacts 120 and 121 and to close the contacts 122 and 123.

In the operation of the system, when the master switch 30 is closed while the thermostat 100 and the space thermostat 102 are calling for heat, the three relay magnets A, B and C will become energized upon the closing of main switch 30. The energizing circuit for the magnet 110 of relay A exists from the supply line 104 through lead 124, magnet 110, leads 125 and 126 to ground 105. The energizing circuit for the magnet 111 of relay B extends from the supply line 104 through lead 127, magnet 111, and leads 125 and 126 to ground. The circuit for the magnet 112 of relay C extends from the supply line 104 through lead 128, magnet 112, and lead 130 to ground.

With the three relays A, B and C thus energized a circuit will exist through the motor field winding 24. This circuit may be traced through the contacts 115 of the relay A, contacts 117 of the relay B, and contacts 123 of the relay C, all of which contacts are closed due to simultaneous energization of the magnets 110, 111 and 112 of the three relays. Such energization of the winding 24 will cause movement of the valve 18 in a direction to restrict the flow of unheated air and to enhance the flow of heated air to the duct 16.

However, such movement of the valve will be only momentary, since the energization of relay C to close a circuit through said motor field 24 also closes a heating circuit through heater 101 which will cause mercury column of duct thermostat 100 to close its contact 108 and thereby de-energize relay C. This cycling action of thermostat 100, due to the shunting of electrical circuit around the magnet 112 of relay C each time thermostat contact is closed, will continue until the duct temperature reaches 200° F.; said shunt circuit extending from the line 104 through leads 128, 131, terminal 108, and lead 130 to ground.

Similarly, when a rise in temperature of the compartment takes place due to a rise of temperature in the compartment 10 and the consequent energization of a shunting circuit leading from the supply line 104 through leads 127, 132, terminal 106, and lead 126, to ground, the thermostat 102 will commence its cycling operations.

The cycling operations of the two thermostats 100 and 102 are quite rapid due to the large amount of current flowing through the auxiliary coils 101 and 103 associated therewith. The current flowing in the coil 101 follows a circuit extending from the supply line 104 through lead 133, contacts 122 (closed when the magnet 112 is energized), lead 134, coil 101 and lead 139 to ground. The current flowing through the coil 103 follows a circuit extending from the line 104 through lead 135, closed contacts 116 of the magnet 110, lead 136, variable resistor 110 of high current passing characteristics, coil 103 and lead 126 to ground.

When the temperature of the compartment 10 rises to such an extent that the column engages the terminal 107, a shunting circuit for the magnet 110 of relay A will exist from the supply line 104 through leads 124, 140, terminals 107, 106 and lead 126 to ground. Existence of this circuit serves to de-energize the magnet 110 of relay A and open the relay contacts 114, 115 and 116 and close the contact 113. Closure of the contacts 113 establishes a potential circuit through the field winding 23 subject to closure of the contacts 121 of the relay C. With both the contacts 113 and 121 closed of relays A and C, a circuit will exist from the line 104 through lead 141, contacts 113, lead 142, contacts 121, and motor field winding 23 to ground. Energization of the motor field winding 23 will cause motor M to move the valve 18 in a direction to restrict the flow of heated air through the branch conduit 13.

The cycling of the two thermostats 100 and 102 will occur independently of each other and it is necessary that, for movement of the valve 18 toward its heat enhancing position, the three magnets 110, 111 and 112 of the relays A, B and C be energized simultaneously. For movement of the valve in the opposite direction to restrict the flow of heat to the duct 16 it is necessary that the magnets 110 and 112 of relays A and C be de-energized simultaneously.

When the temperature of the compartment 10 is sufficiently low as to open contact 106 of thermostat 102, the relay A is energized and its contacts 114 become closed and intermittent closing of the contacts 120 of the relay C during cycling of the thermostat 100 will establish a circuit extending from the line 104 through lead 144, contacts 114, lead 145, contacts 120, lead 146, resistor 147, lead 148, coil 103 and lead 126 to ground. Thus the resistor 147 maintains a flow of heating current through the heating coil 103 of the thermostat 102 even during the brief intervals of time during cycling of the thermostat 100 when the relay A is energized. This materially contributes toward the desired rapid cycling action of the said thermostat 102.

Generally speaking, the lower the temperature of the compartment, the longer will be the periods of simultaneous energization of the magnets 110, 111 and 112 of relays A, B and C to cause movement of valve 18 in a clockwise direction. As the temperature of the compartment rises, such simultaneous energization of all three relays becomes of less duration so that the increments of motion applied to the valve become smaller until a degree of substantial stability of the control valve 18 takes place.

While the invention is illustrated herein in connection with a specific form of heating system involving the blending of heated and unheated air, it will be understood that the invention is not to be limited to the specific constructions herein shown except insofar as such constructions are pointed out in the accompanying claims.

We claim:

1. In a temperature control system for proportionately blending air streams of different temperatures delivered to a distribution duct for subsequent delivery to an enclosure, a proportioning valve movable in opposite directions to restrict the flow of air issuing from one of said streams and enhance the flow of air issuing from the other stream and vice versa, a reversible electric motor for moving said valve, a circuit for operating the motor in one direction, a circuit for operating the motor in the opposite direction, a thermostat responsive to the temperature of air in said duct, a thermostat responsive to the temperature of air in said enclosure, a pair of normally open relay-operated contacts in one of said circuits, a normally energized relay magnet subject to de-energization when the said duct thermostat attains a predetermined temperature for closing said contacts when the relay magnet is energized, a second pair of normally open relay-operated contacts in series with said first contacts in the circuit, and a normally energized relay magnet subject to de-energization when the said enclosure thermostat attains a predetermined temperature for closing said second pair of contacts when the latter magnet is energized.

2. In a temperature control system for proportionately blending two air streams of different temperatures delivered to a distribution duct for subsequent conduction to an enclosure, a proportioning valve movable in opposite directions to restrict the flow of air issuing from one of said streams and enhance the flow of air issuing from the other stream and vice versa, a reversible electric motor for moving said valve, a circuit for operating said motor in one direction, a circuit for operating the motor in the opposite direction, a thermostat responsive to the temperature of air in said duct, a thermostat responsive to the temperature of air in said enclosure, a pair of normally open relay-operated contacts in one of said circuits, a normally energized relay magnet subject to de-energization when the said duct thermostat attains a predetermined temperature for closing said contacts when the magnet is energized, a second pair of normally open relay-operated contacts in series with said first contacts in the circuit, a normally energized relay magnet subject to de-energization when the said enclosure thermostat attains a predetermined temperature for closing said second pair of contacts when the magnet is energized, a third pair of normally open relay-operated contacts in series with said other pairs of contacts in the circuit, and a normally energized relay magnet subject to de-energization when the ambient temperature of said duct thermostat attains a still higher predetermined maximum, for closing said third pair of contacts when the magnet is energized.

3. In a temperature control system for proportionately blending a heated air stream and an unheated air stream delivered to a distribution duct for subsequent delivery to an enclosure, a control valve movable in opposite directions to restrict the flow of air issuing from one of said streams and enhance the flow of air issuing from the other stream and vice versa, a reversible electric motor for moving said valve, a circuit for operating the motor in a direction to enhance the flow of heated air to said duct, a circuit for operating the motor in the opposite direction, a thermostat responsive to the temperature of air in said duct, a thermostat responsive to the temperature of air in said enclosure, a pair of normally open relay-operated contacts in said first motor circuit, a normally energized relay magnet subject to de-energization when the said duct thermostat attains a predetermined temperature for closing said contacts when the magnet is energized, a second pair of normally open relay-operated contacts in said first motor circuit, and a normally energized relay magnet subject to de-energization when the said enclosure thermostat attains a predetermined temperature for closing said second pair of contacts when the latter magnet is energized.

4. A temperature control system for proportionately blending a heated air stream and an unheated air stream delivered to a distribution duct for subsequent delivery to an enclosure comprising a control valve movable in opposite directions to restrict the flow of air issuing from one of said streams and enhance the flow of air issuing from the other stream and vice versa, a reversible electric motor for moving said valve, a circuit for operating the motor in a direction to enhance the flow of heated air to said duct, a thermostat responsive to the temperature of air in said duct, a thermostat responsive to the temperature of air within said enclosure, a pair of normally open relay-operated contacts in said first motor circuit, a normally energized relay magnet subject to de-energization when the said duct thermostat attains a predetermined temperature for closing said contacts when the magnet is energized, a second pair of normally open relay-operated contacts in said first motor circuit, a normally energized relay magnet subject to de-energization when the said enclosure thermostat attains a predetermined temperature for closing said second pair of contacts when the latter magnet is energized, a third pair of normally open relay-operated contacts in said first motor circuit, and a normally energized relay magnet subject to de-energization when the ambient temperature of said duct thermostat attains a still higher predetermined maximum for closing said third pair of contacts when the latter magnet is energized.

5. A temperature control system as defined in claim 4 and including a pair of normally closed contacts in said second motor circuit adapted to become open under the control of said third relay magnet when the latter is energized, and a second pair of normally closed contacts in said second motor circuit adapted to become opened under the control of said second relay magnet when the latter is energized, said normally closed contacts, when simultaneously closed serving to close the second motor circuit to cause movement of the valve in a direction to restrict the flow of heated air to said duct.

6. A temperature control system as defined in claim 1 and including a third pair of normally open relay-operated contacts in series with said other pairs of contacts in the circuit, and a normally energized relay magnet subject to de-energization when the ambient temperature of said enclosure attains a still higher predetermined maximum for closing said third pair of contacts when the magnet is energized.

7. The combination with a distributing duct for supplying heat to an enclosure, a conduit for heated air in communication with the duct, a conduit for unheated air in communication with the duct, a valve common to said conduits for regulating the proportion of heated and unheated air supplied to the duct and a reversible electric motor for moving the valve in opposite directions, of a circuit for operating the motor in a forward direction, a duct thermostat responsive to temperature variations in the duct, relay means controlled by the duct thermostat for closing said motor operating circuit, an enclosure thermostat responsive to temperature variations in the enclosure for controlling the reverse movements of said motor, an electrical heater for applying auxiliary heat to said duct thermostat, and an energizing circuit for said heater connected through said relay means, whereby the electrical heater is controlled by said duct thermostat to offset abrupt accelerations of the temperature of heated air delivered to said duct through said first mentioned conduit.

8. The combination set forth in claim 7 including an electrical heater for applying auxiliary heat to said enclosure thermostat and relay means operable under the control of said enclosure thermostat for controlling the operation of said latter electrical heater and to render the duct thermostat ineffective to control the relay for closing said circuit for imparting forward movements of said motor.

9. The combination set forth in claim 7 including additional relay means operable under the control of said duct thermostat for rendering said enclosure thermostat ineffective to control the reverse movements of said motor.

10. The combination set forth in claim 7 including additional relay means operable under the control of said enclosure thermostat for rendering said former thermostat ineffective to control the forward movements of said motor.

TIMOTHY J. LEHANE.
EDWARD W. JOHNSON.

References Cited in the file of this patent
UNITED STATES PATENTS

| Number | Name | Date |
|---|---|---|
| 2,522,287 | Lehane et al. | Sept. 12, 1950 |